(12) United States Patent
Hanson

(10) Patent No.: US 7,784,314 B2
(45) Date of Patent: Aug. 31, 2010

(54) TIRE SECURING DEVICE

(76) Inventor: Mark Hanson, 2754 Lancaster Dr., Joliet, IL (US) 60433

( * ) Notice: Subject to any disclaimer, the term of this patent is extended or adjusted under 35 U.S.C. 154(b) by 234 days.

(21) Appl. No.: 12/113,125

(22) Filed: Apr. 30, 2008

(65) Prior Publication Data

US 2009/0272158 A1    Nov. 5, 2009

(51) Int. Cl.
*B62D 43/04* (2006.01)
*E05B 65/12* (2006.01)
(52) U.S. Cl. .................. 70/259; 70/232; 224/42.25
(58) Field of Classification Search .............. 70/259, 70/260, 232, DIG. 57; 224/42.2, 42.23, 42.25; 254/323; 296/1.05, 37.2; 411/910; 414/463
See application file for complete search history.

(56) References Cited

U.S. PATENT DOCUMENTS

| 1,412,646 | A | * | 4/1922 | Augenbraun | 70/260 |
|---|---|---|---|---|---|
| 1,554,958 | A | * | 9/1925 | Falk | 70/260 |
| 1,586,298 | A | * | 5/1926 | Eaton | 70/260 |
| 1,589,433 | A | * | 6/1926 | Schmid | 70/260 |
| 1,609,440 | A | * | 12/1926 | Szydlowski | 70/260 |
| 1,656,253 | A | * | 1/1928 | Weaver et al. | 70/260 |
| 1,800,708 | A | * | 4/1931 | Wartian | 70/18 |
| 4,282,995 | A | * | 8/1981 | Austin | 224/42.23 |
| 4,526,021 | A | * | 7/1985 | Princell | 70/183 |
| 5,199,287 | A | * | 4/1993 | McClary | 70/259 |
| 5,211,043 | A | * | 5/1993 | Langdon | 70/259 |
| 5,426,963 | A | * | 6/1995 | Tafoya et al. | 70/259 |
| 5,477,711 | A | * | 12/1995 | Oliveri | 70/369 |
| 5,791,633 | A | * | 8/1998 | Walker | 254/323 |
| 5,802,895 | A | * | 9/1998 | Osgood | 70/259 |
| 6,047,574 | A | * | 4/2000 | Kozlowski et al. | 70/259 |
| 6,370,927 | B1 | * | 4/2002 | Gonzalez et al. | 70/259 |
| 6,505,488 | B1 | * | 1/2003 | Princell | 70/259 |

* cited by examiner

*Primary Examiner*—Lloyd A Gall
(74) *Attorney, Agent, or Firm*—Justin Lampel

(57) ABSTRACT

The present invention generally relates to a device for securing a tire to a vehicle so as to reduce the accidental or unauthorized removal of the tire from the vehicle. The device is particularly suitable for preventing the theft of a spare tire from a vehicle. More specifically, the device prevents an unauthorized user from gaining access to an opening in the vehicle which is used to lower and remove the spare. As a result, the device may save an individual hundreds of dollars and the annoyance of not having a spare tire when needed. The device is easily installed in many vehicles in around one minute.

3 Claims, 3 Drawing Sheets

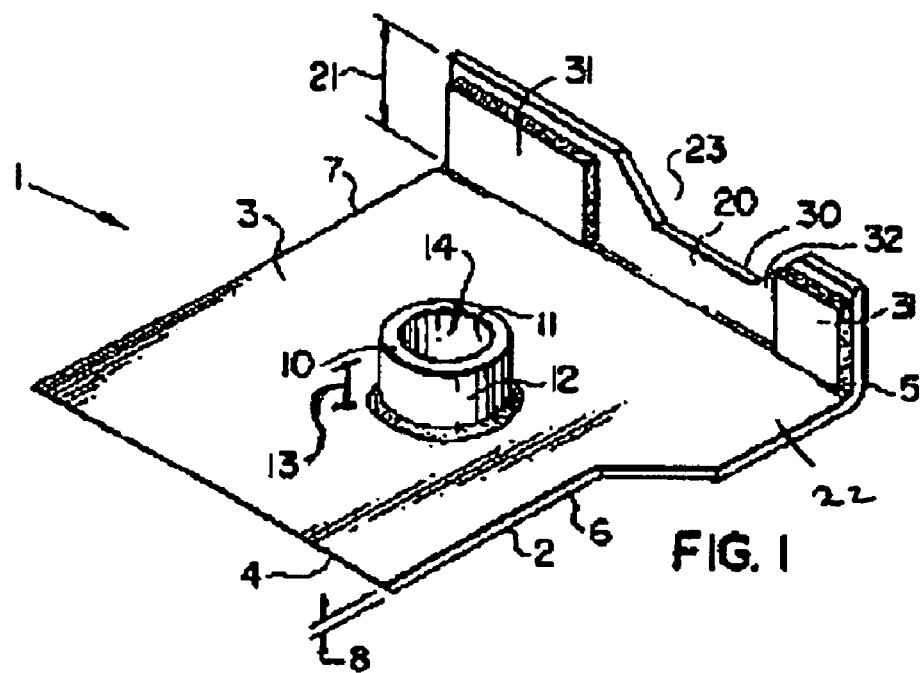
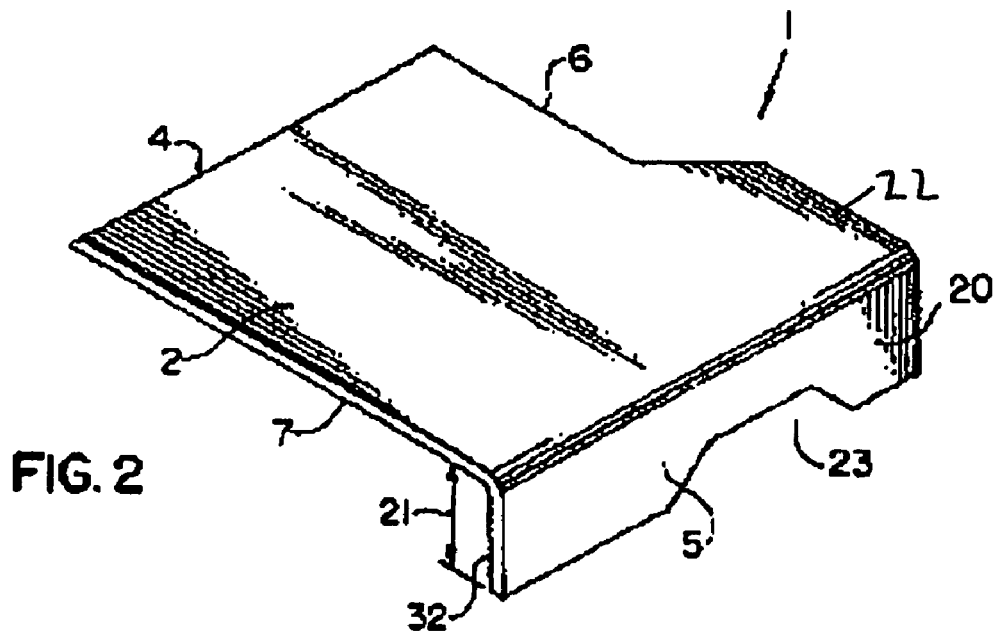
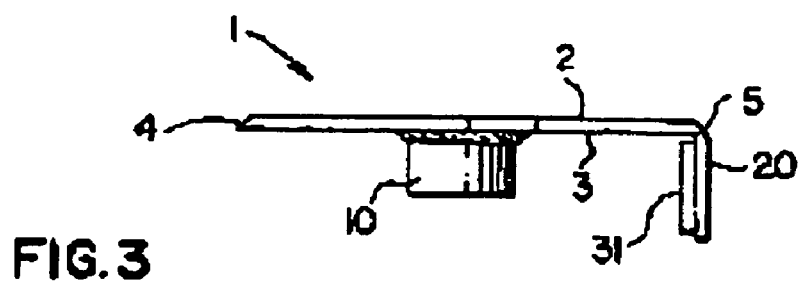

TIRE SECURING DEVICE

BACKGROUND OF THE INVENTION

The present invention generally relates to a device for securing a tire to a vehicle so as to reduce the accidental or unauthorized removal of the tire from the vehicle. The device is particularly suitable for preventing the theft of a spare tire from a vehicle. More specifically, the device prevents an unauthorized user from gaining access to an opening in the vehicle which is used to lower and remove the spare. As a result, the device may save an individual hundreds of dollars and the annoyance of not having a spare tire when needed. The device is easily installed in many vehicles in around one minute.

Every year tens of thousands of spare tires are stolen from vehicles. Vehicles having the spare tire located on the back or underneath the vehicle are particularly susceptible. In order to prevent this unauthorized removal, many car and truck makers have installed an anti-theft bracket on the back of their vehicles. The anti-theft bracket typically covers an opening which allows the owner to lower the spare tire. The problem with these anti-theft brackets is that they can often quickly and easily be bent out of shape thereby allowing access to the opening. A thief may then insert a socket wrench into the opening, lower the tire and make off with the spare. An experienced thief can make off with the tire in around one minute costing the owner of the vehicle hundreds of dollars to replace the spare and rim. Even worse, the owner may only become aware of the missing spare while stranded with a flat tire.

Certain attempts have been made to provide a device which prevents the theft of spare tires. For example, U.S. Pat. No. 5,426,963 to Tafoya discloses a spare tire access hole lock for preventing the theft of spare tires on vehicles equipped with undercarriage mounted spare tires. The spare tire access hole lock is particularly suited for use on trucks that are equipped with an access hole in the bumper for facilitating the insertion of a tool necessary to release the spare tire from stowage. The spare tire access hole lock prevents entrance of a tool to release the spare tire from stowage by obstructing access to the spare tire release mechanism through the spare tire access hole. The spare tire access hole lock may be used by inserting it through the spare tire access hole and securing it with a standard padlock to prevent its removal.

Further, U.S. Pat. No. 4,282,995 to Austin discloses a spare tire bracket lock to prevent the theft of a spare tire from a pick-up truck or a similar vehicle of the type wherein the spare tire is stored beneath the undercarriage of the vehicle. The spare tire is supported by an elongated mounting bracket, which bracket is in turn supported by a pair of bolts secured to the undercarriage of the vehicle. A nut engages the lower portion of one of the bolts for removably securing the bracket thereto. The nut includes a flange having an eye for receiving the shackle of a padlock. The spare tire bracket lock includes a lipped portion which is slid over one edge of the bracket, the flange of the nut being simultaneously slid through a slot in the spare tire bracket lock. Positioned adjacent opposite faces of the flange are locking members having holes aligned with the eye of the flange for allowing the shackle of a padlock to be simultaneously passed through the holes in the locking members and the eye of the flange. The spare tire bracket lock also includes a shield plate for restricting access to the shackle of the padlock.

However, these existing tire anti-theft devices fail to perform the anti-theft function in the simple and efficient manner as the present invention. A need, therefore, exists for an improved device which prevents the accidental or unauthorized removal of a spare tire from a vehicle.

SUMMARY OF THE INVENTION

The present invention generally relates to a device for securing a tire to a vehicle so as to reduce the accidental or unauthorized removal of the tire from the vehicle. The device is particularly suitable for preventing the theft of a spare tire from a vehicle. More specifically, the device prevents an unauthorized user from gaining access to an opening in the vehicle which is used to lower and remove the spare. As a result, the device may save an individual hundreds of dollars and the annoyance of not having a spare tire when needed. The device is easily installed in many vehicles in around one minute.

An advantage of the present invention is to provide a device which prevents the accidental removal of a tire from a vehicle.

Another advantage of the present invention is to provide a device which prevents the unauthorized removal of a tire from a vehicle.

Yet another advantage of the present invention is to provide a device which prevents the unauthorized removal of a tire from a vehicle which can be easily installed.

And another advantage of the present invention is to provide a device which prevents the unauthorized removal of a tire from a vehicle which can be easily installed from the back of the vehicle, as opposed to underneath the vehicle.

Still another advantage of the present invention is to provide a device which prevents the unauthorized removal of a tire from a vehicle which is light weight.

And another advantage of the present invention is to provide a device which prevents the unauthorized removal of a tire from a vehicle which will not damage the vehicle or the finish on the vehicle.

A still further advantage of the present invention is to provide a device which prevents the unauthorized removal of a tire which does not incorporate a lock which may corrode and/or freeze.

An advantage of the present invention is to provide a device which prevents the unauthorized removal of a tire from a vehicle which does not have a bolt or chain which may be easily cut by a bolt cutter.

Still another advantage of the present invention is to provide a device which prevents the unauthorized removal of a tire from a vehicle which is reusable.

Yet another advantage of the present invention is to provide a device which prevents the unauthorized removal of a tire from a vehicle which does not require a key (which may become lost).

And another advantage of the present invention is to provide a device which prevents the unauthorized removal of a tire from a vehicle which does not require any tools to install.

For a more complete understanding of the above listed features and advantages of the spare tire saving device, reference should be made to the following detailed description of the preferred embodiments and to the accompanying drawings. Further, additional features and advantages of the present invention are described in, and will be apparent from, the detailed description of the preferred embodiments and from the drawings.

BRIEF DESCRIPTION OF THE DRAWINGS

FIG. 1 illustrates a bottom perspective view of the securing device of the present invention.

FIG. 2 illustrates a top perspective view of the securing device of the present invention.

FIG. 3 illustrates a side perspective view of the securing device of the present invention.

DETAILED DESCRIPTION OF THE PREFERRED EMBODIMENTS

Figure 4A:
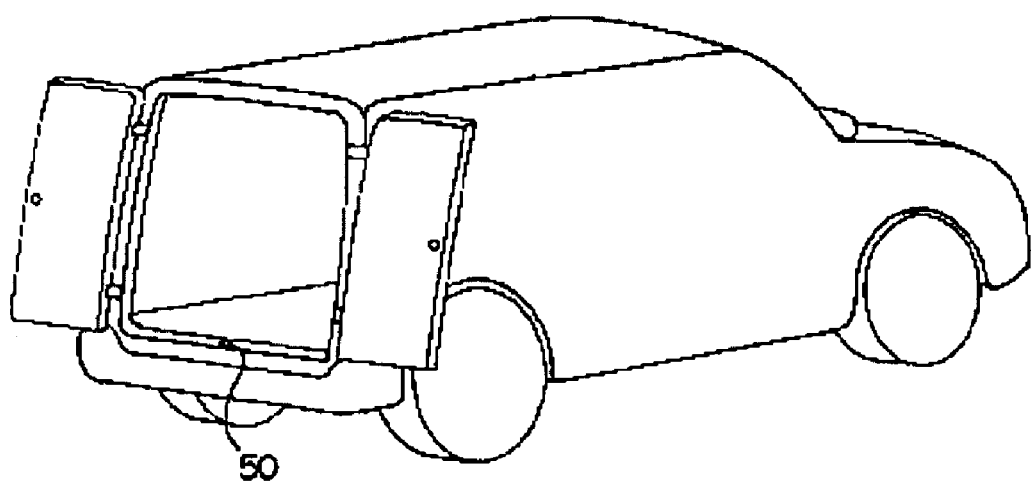
FIGS. 4a and 4b illustrates the device inserted into a vehicle and the doors of the vehicle closed.

The present invention generally relates to a device for securing a tire to a vehicle so as to reduce the accidental or unauthorized removal of the tire from the vehicle. The device is particularly suitable for preventing the theft of a spare tire from a vehicle. More specifically, the device prevents an unauthorized user from gaining access to an opening in the vehicle which is used to lower and remove the spare. As a result, the device may save an individual hundreds of dollars and the annoyance of not having a spare tire when needed. The device is easily installed in many vehicles in around one minute.

Referring now to FIG. 1, the securing device 1 may have a top side 2 (as illustrated in FIG. 2), a bottom side 3, a front 4, a back 5, a first side 6 and a second side 7. The top side 2 and the bottom side 3 may be largely square shaped. The device 1 may further have a thickness 8 which is fairly small. The device 1 is preferably made from a strong metal, such as, for example, high grade quality steel; although it should be understood that the device may be constructed from any suitable material.

The bottom side 3 of the device 1 may have a generally cylindrical attachment 10 having an interior wall 11, an exterior wall 12, a height 13 and a hollow interior 14. The generally cylindrical attachment 10 may be molded to the bottom side 3 of the device 1 or may be initially formed with the device 1. A portion of the bottom side 3 of the device 1 may act as a bottom of the generally cylindrical attachment 10. It should be noted that the generally cylindrical attachment 10 may be of any suitable shape.

The back 5 of the device 1 may have a portion 20 which may extend downward in the same direction as the generally cylindrical attachment 10. The portion 20 of the back 5 of the device 1 may have a height 21 which may be slightly larger than the height 13 of the generally cylindrical attachment 10. A portion 22 of the first side 6 of the device 1 may extend outward away from the second side 7 of the device 1. This portion 22 of the first side 6 of the device may extend around, for example, clips which are used to attach weather stripping to a frame of the vehicle. An indentation 23 may be present on the portion 20 of the back 5 of the device 1. The indentation 23 on the portion 20 of the back 5 of the device 1 may be present to avoid the device 1 from interfering with, for example, a bracket on the frame of the vehicle. The bottom end 30 of the indentation 23 may be roughly at the same level as the height 13 of the generally cylindrical attachment 10. It should be noted that the indentation 23 and the portion 22 of the first side 6 of the device 1 which extends outward may be specifically tailored for a specific type of vehicle such as, for example, a Ford® vehicle. The device 1 of the present invention may be of any shape, including substantially square, so as to be usable in any type vehicle having an opening 50 which is used to gain access to a spare tire (see below).

A securing device 31 may be located on an interior surface 32 of the portion 20 of the back 5. The securing device 31 may be, for example, a hook and loop fastener system where one portion of the hook and loop fastener is located on the device 1 and the other portion is located on the vehicle (See FIG. 4). FIG. 1 illustrates the device 1 having two hook and loop fastener attachments, however any number of attachments may be used and in any shape as long as enough of the system is utilized to secure the device 1 to the vehicle. Further, an alternative means for securing the device 1 to the vehicle may be used such as, for example, a screw, magnetic, tape of the like.

Figure 4B:
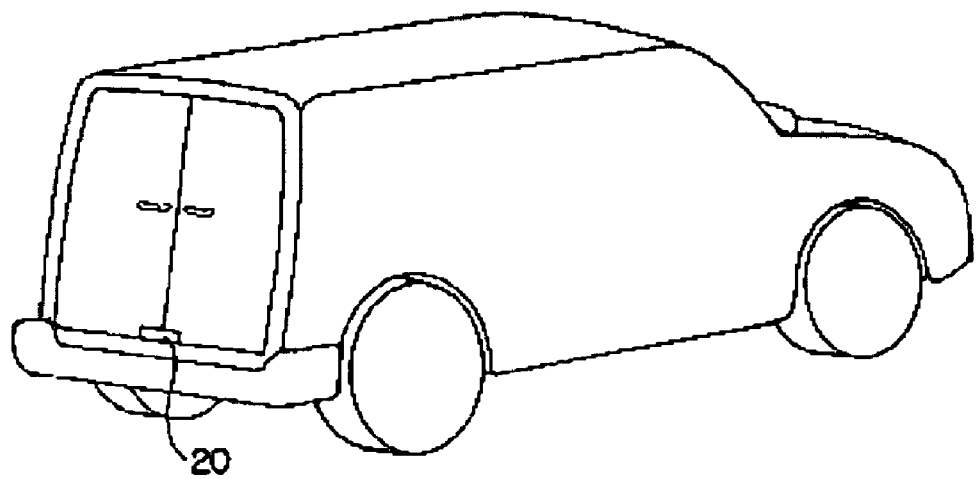

Referring now to FIG. 4, typically, the back of many vehicles (especially trucks and vans) have an opening 50 near the back side just above the bumper. Within the opening 50 of the vehicle is typically a bolt or a screw. The bolt or screw is turned and a spare tire 60 (usually secured horizontally underneath the vehicle) is lowered and freed from the vehicle. As a result, an individual must gain access to the opening 50 to ultimately remove the spare tire 60. A problem arises in that, even when the back doors of the vehicle are closed, unauthorized individuals can still obtain access to the opening 50 and thereby lower and steal the spare tire 60. The unauthorized individual does not even need to gain access to the interior of the vehicle. Accordingly, it is the object of this device 1 to prevent unauthorized individuals from gaining access to the opening 50 of the vehicle.

To install the device 1 the user opens the back doors of the vehicle to fully expose the entire opening 50. The bottom side 3 of the device 1 may then be placed directly over the opening 50 with the generally cylindrical attachment 10 covering the bolt or screw which is located on the vehicle and which is used to lower the spare tire 60. The top side 2 of the device 1 remains upright (therefore, when installed, the generally cylindrical attachment 10 is not visible). The interior wall 11 of the generally cylindrical attachment 10 may at least partly surround the bolt or screw so as to help prevent the device 1 from unintentionally shifting during use. More specifically, the generally cylindrical attachment 10 may prevent the device 1 from sliding away from the opening 50 and thereby allowing an unauthorized user from gaining access to the opening 50. Alternatively, the cylindrical attachment 10 may not surround the bolt or screw may simply prevent the device 1 from being intentionally or unintentionally slid over the opening 50; thereby exposing the opening 50. More specifically, if the cylindrical attachment 10 does not surround the bolt or screw, the exterior walls 12 may bump into the side wall of the opening 50 so as to prevent the device 1 from moving.

The portion 20 of the back 5 of the device 1 may be inserted in a narrow slit between the bumper of the vehicle and the end of the vehicle bed. The securing device 31 on the device 1 may removably attach to a corresponding section located on the vehicle. When the device 1 is secured over the opening 50 the doors of the vehicle may be closed and only a portion of the device 1 may be visible from the outside of the vehicle (a portion of the device 1 may be located within the interior of the vehicle). Because only a portion of the device is accessible from the outside of the vehicle and because of the pressure the closed doors on the device 1, unauthorized users are prevented from moving the device 1 and, therefore, gaining access to the opening 50 and, ultimately, the spare tire 60.

If the owner wishes to remove the device 1 to, for example, gain access to the spare tire 60, the owner simply opens the back doors of the vehicle and exerts a modest force upward to separate the two corresponding securing devices 1 on the back 5 portion 20 and the vehicle. The total installation time and removal time is typically measured in seconds. The only tools required to install or remove the device 1 is the user's hands. A further advantage of this device 1, unlike most other security devices, is that the user may easily install and remove the device standing up and from the back of the vehicle as opposed to other security devices which require an individual to get on their back on the ground and go under the vehicle.

Figure 5:
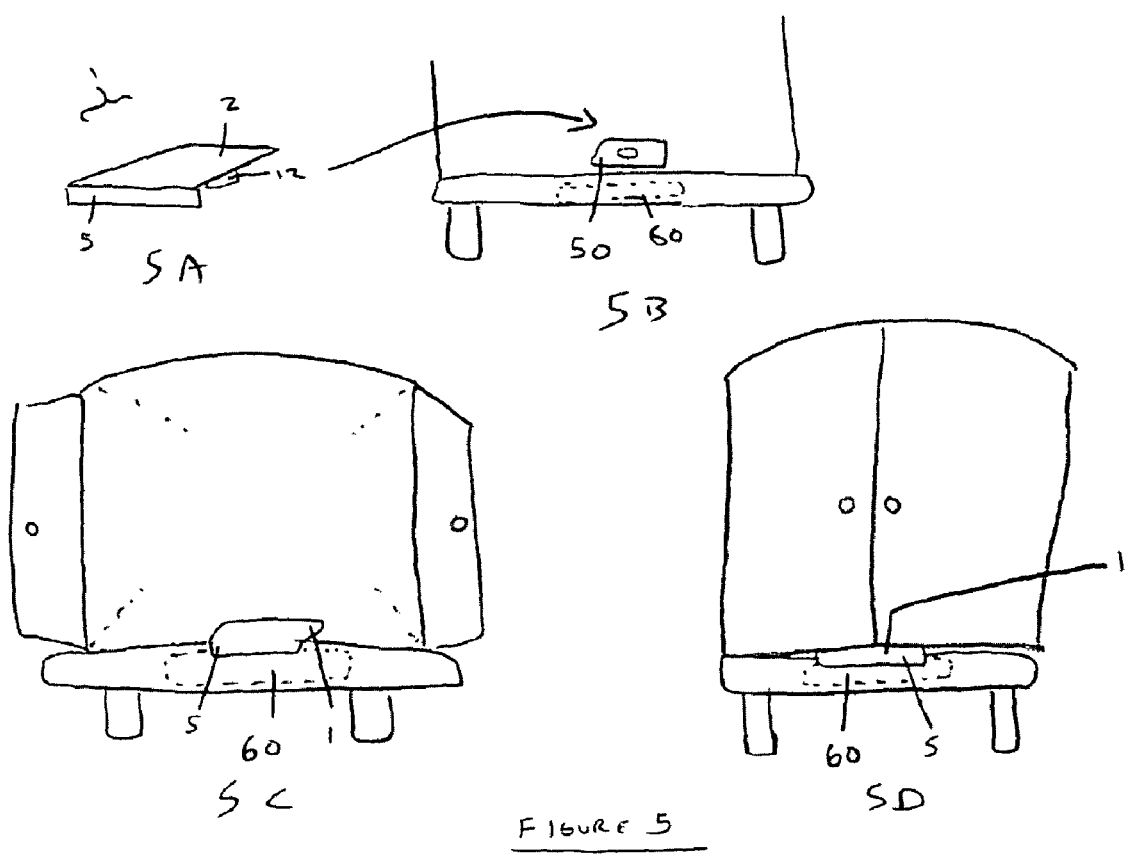
FIG. 5 illustrates detailed drawings of the device being inserted into an opening of the vehicle.

Referring now to FIG. 5, the device 1 is illustrated as being inserted over the opening 50 of the vehicle. The device 1 in FIG. 5 is illustrated in an alternative embodiment of having a generally square shape. It should be noted that any suitable shape may be used to cover the opening 50 of the vehicle and prevent the spare tire from being removed. FIG. 5 illustrates the tire 60 in phantom under the vehicle. The opening 50 of the vehicle is substantially covered while the device 1 is inserted in place over the opening 50. The closing of the doors of the vehicle secures the device 1 and prevents movement of the device 1 from over the opening 50 of the vehicle.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An anti-tire removal device comprising:
a frame having a top side, a bottom side, a thickness, a front, a back, a first side and a second side;
a downwardly extending portion on the back of the frame wherein the downwardly extending portion runs the entire length of the back and wherein the downwardly extending portion extends farther downward than the thickness of the frame;
a generally cylindrical attachment on the bottom side of the frame wherein the generally cylindrical attachment is adapted to be inserted into a spare tire release opening of a vehicle and wherein the generally cylindrical attachment has a hollow interior which is adapted to at least partly cover a bolt or screw in the spare tire release opening wherein the bolt or screw secures a tire to the vehicle; and
and wherein the top side of the frame is adapted to substantially cover an opening of a vehicle spare tire release apparatus and prevent access to a spare tire of the vehicle.

2. The anti-tire removal device of claim 1 further comprising:
a fastening device on a front side of the downwardly extending portion wherein the fastening device is adapted to be removably attached to a metal frame of the vehicle.

3. A method of using an anti-tire removal device comprising the steps of:
opening at least one back door of a vehicle having an opening for releasing a spare tire;
providing a frame having a top side, a bottom side, a thickness, a front, a back, a first side and a second side;
providing a downwardly extending portion on the back of the frame wherein the downwardly extending portion extends farther downward than the thickness of the frame;
providing a generally cylindrical attachment on the bottom side of the frame wherein the generally cylindrical attachment on the bottom side of the frame has a hollow interior which at least partly covers a bolt or screw in a spare tire release opening wherein the bolt or screw secures a tire to the vehicle and wherein the generally cylindrical attachment is inserted into the spare tire release opening of the vehicle and wherein the top side of the frame substantially covers the opening of the vehicle and prevents access to a spare tire release apparatus;
placing the device over the spare tire release opening of the vehicle; and
closing the at least one door of the vehicle.

* * * * *